(12) United States Patent
Kingston et al.

(10) Patent No.: US 8,540,067 B2
(45) Date of Patent: Sep. 24, 2013

(54) POWER TRANSMISSION ARRANGEMENT

(75) Inventors: Timothy Kingston, Eskilstuna (SE); Mats Akerblom, Eskilstuna (SE); Thomas Andersson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 831 days.

(21) Appl. No.: 12/527,571

(22) PCT Filed: Mar. 21, 2007

(86) PCT No.: PCT/SE2007/000280
§ 371 (c)(1),
(2), (4) Date: Aug. 18, 2009

(87) PCT Pub. No.: WO2008/115104
PCT Pub. Date: Sep. 25, 2008

(65) Prior Publication Data
US 2010/0072021 A1    Mar. 25, 2010

(51) Int. Cl.
*B60W 10/18* (2012.01)
(52) U.S. Cl.
USPC .................. 192/218; 192/219.4; 475/231
(58) Field of Classification Search
USPC .............. 192/215, 218, 219.4, 221, 225; 475/220–222, 230
See application file for complete search history.

(56) References Cited

U.S. PATENT DOCUMENTS

| | | | |
|---|---|---|---|
| 3,814,222 A | 6/1974 | Koivunen | |
| 4,113,044 A | 9/1978 | Williams et al. | |
| 5,078,248 A | 1/1992 | Yesnik | |
| 7,044,880 B2 * | 5/2006 | Bowen | 475/205 |
| 7,186,200 B1 * | 3/2007 | Hauser | 475/220 |
| 2008/0087485 A1 * | 4/2008 | Andersson et al. | 180/247 |
| 2010/0075796 A1 * | 3/2010 | Nehse | 475/220 |
| 2010/0285917 A1 * | 11/2010 | Rahm | 475/220 |

FOREIGN PATENT DOCUMENTS

| | | |
|---|---|---|
| DE | 3935723 A1 | 5/1990 |
| FR | 1551614 A | 12/1968 |
| GB | 2307669 A * | 6/1997 |

OTHER PUBLICATIONS

International Search Report for corresponding International Application PCT/SE2007/000280.
International Preliminary Report on Patentability for corresponding International Application PCT/SE2007/000280.
Supplementary European Search Report for corresponding European App. EP 07 71 6082.

* cited by examiner

*Primary Examiner* — David D Le
*Assistant Examiner* — Huan Le
(74) *Attorney, Agent, or Firm* — WRB-IP LLP

(57) ABSTRACT

A power transmission arrangement includes a differential gear adapted to transfer power from an input shaft to a first output shaft, and a first brake adapted to effect the first output shaft and a second brake adapted to effect the input shaft.

19 Claims, 4 Drawing Sheets

POWER TRANSMISSION ARRANGEMENT

The present invention relates to a power transmission arrangement comprising a differential gear adapted to transfer power from an input shaft to a first output shaft, and a first brake means adapted to effect the first output shaft. The invention further relates to a powertrain comprising the power transmission arrangement and to a vehicle comprising the powertrain.

The term "vehicle" comprises among others a work machine, a truck and a tractor. The term "work machine" comprises different types of material handling machines like construction machines, such as a wheel loader, a backhoe loader and an articulated hauler. A work machine is provided with a container, bucket or other type of work implement for carrying/transporting a load. Further terms frequently used for work machines are "earth-moving machinery" and "off-road work machines". The invention will be described below in a case in which it is applied in a frame-steered work machine constituting an articulated hauler. This is to be regarded only as an example of a preferred application.

The powertrain is adapted for propelling the vehicle via ground engaging members (wheels or crawlers) arranged on a front axle and at least one rear axle, respectively. A transfer gear box comprises the differential gear. The first output shaft from the transfer gear box is adapted to transfer power to the rear axle(s) and a second output shaft from the transfer gear box is adapted to transfer power to the front axle. A power source, preferably an internal combustion engine, and especially a diesel engine, is adapted to provide power to the transfer gear box via a main gear box.

In connection with transportation of heavy loads, e.g. in contracting work, articulated haulers (also called frame-steered load-carrying vehicles) are frequently used. An articulated hauler may be operated with large and heavy loads in areas where there are no roads, for example for transports in connection with road or tunnel building, sand pits, mines and similar environments.

The first brake means forms a parking brake in the articulated hauler application. A known such first brake means is passive and more particularly of a spring applied hydraulic release type. It comprises a spring applied brake disc. Further, it is known to lock the differential gear via a dog clutch. Both the front and rear wheels are locked by simultaneously applying both the first brake means and the dog clutch.

It is desirable to achieve a power transmission arrangement that is capable of holding a heavy vehicle standing still in extreme situations, such as in steep slopes, and which creates conditions for a long life. Further, it is desirable to provide an efficient design with regard to space.

According to an aspect of the present invention, a power transmission arrangement comprising a differential gear adapted to transfer power from an input shaft to a first output shaft, and a first brake means adapted to effect the first output shaft characterized in that the arrangement comprises a second brake means adapted to effect the input shaft.

Thus, the power transmission arrangement is adapted for achieving an improved differential gear lock mechanism. Further, due to space constraints, it is in many applications preferable to position the brake means outside a casing of the transfer gear box.

According to a preferred embodiment of the invention, the second brake means is adapted to act on the input shaft. Preferably, the second brake means forms a disc brake. Such a configuration creates conditions for a stronger braking effect than the previously known dog clutch. It is further preferred that the second brake means is spring-loaded. Further, the second brake means is preferably adapted for the parking brake function.

According to a further preferred embodiment of the invention, the first brake means is configured to brake a substantially larger torque than the second brake means. In this way, the required parking brake function is achieved in an efficient way with regard to weight and space. It is normally sufficient that the second brake means is configured to brake about half the torque that the first brake means is capable of.

Further features of the invention and advantageous effects thereof will be apparent from the following description.

BRIEF DESCRIPTION OF THE DRAWINGS

The invention will be explained below, with reference to the embodiments shown on the appended drawings, wherein.

DETAILED DESCRIPTION

Figure 1:
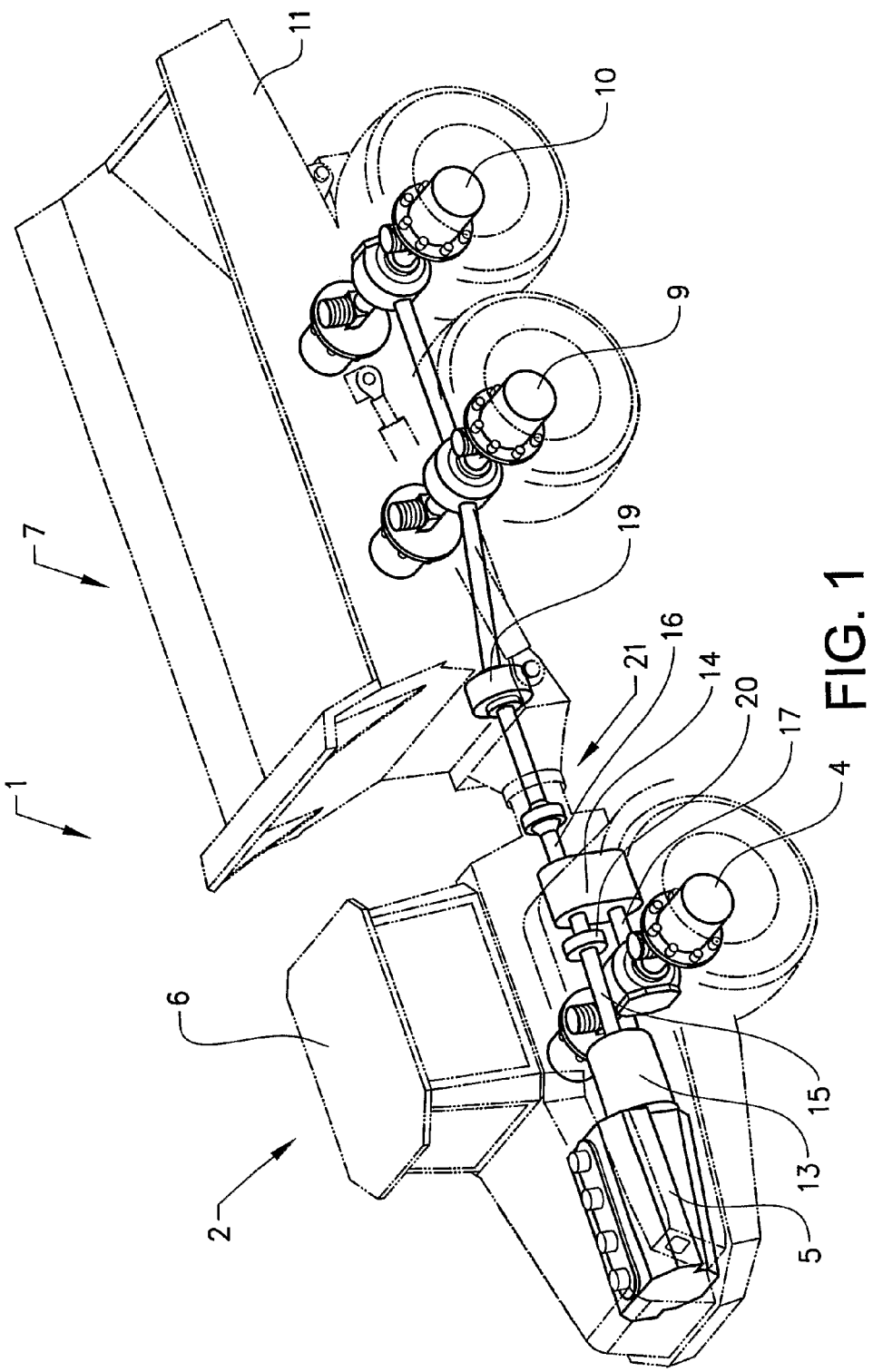
FIG. 1 illustrates an articulated hauler in a perspective, partly cut view.

FIG. 1 illustrates an articulated hauler 1 in a perspective, partly cut view. The articulated hauler 1 comprises a front vehicle section 2 comprising a front frame 3, see FIG. 2, a front wheel axle 4, a source of motive power in the form of a diesel engine 5 for propelling the vehicle and a cab 6 for an operator. The articulated hauler 1 also comprises a rear vehicle section 7 comprising a rear frame 8, see FIG. 2, a front wheel axle 9, a rear wheel axle 10 and a tiltable load-carrying container, or platform 11. The front and rear wheel axle 9,10 of the rear vehicle section 7 are connected to the rear frame via a bogie arrangement 12, see FIG. 2, and may therefore be referred to as front bogie axle 9 and rear bogie axle 10.

FIG. 1 further schematically illustrates a driveline of the articulated hauler 1. The driveline comprises a main gear box 13 in the form of an automatic transmission rotatively connected to an output shaft of the engine 5. The main gear box 13 has for example six forward gear ratios and two reverse gear ratios. The driveline further comprises a transfer gear box 14 rotatively connected to an output shaft of the main gear box 13. The transfer gear box 14 is arranged to distribute the power from the main gear box between the front wheel axle 4 and the two rear bogie axles 9,10. An input shaft/differential case 15 is adapted to transmit power to the transfer gear box 14. A first output shaft 16 is adapted to transmit power from the transfer gear box 14 to the rear axle 9 (and rear axle 10). A second output shaft 17 is adapted to transmit power from the transfer gear box 14 to the front wheel axle 4.

A first brake means 19 is arranged downstream of the transfer gear box 14 in a power transmission path from the power source 5 to the wheels. More specifically, the first brake means 19 is adapted to effect the first output shaft 16 and in fact adapted to act on the first output shaft 16. More specifically, the first brake means 19 is configured to prevent initiation of rotation of the shaft 16 from a non-rotating state. Thus, the first brake means 19 has a parking brake function. Thus, the first brake means 19 acts on the trailer unit propeller shaft 16.

A second brake means 20 is adapted to act on the input shaft/differential case 15. More specifically, the second brake means 20 is configured to prevent initiation of rotation of the shaft/differential case 15 from a non-rotating state. Thus, the second brake means 20 has a parking brake function.

Figure 2:
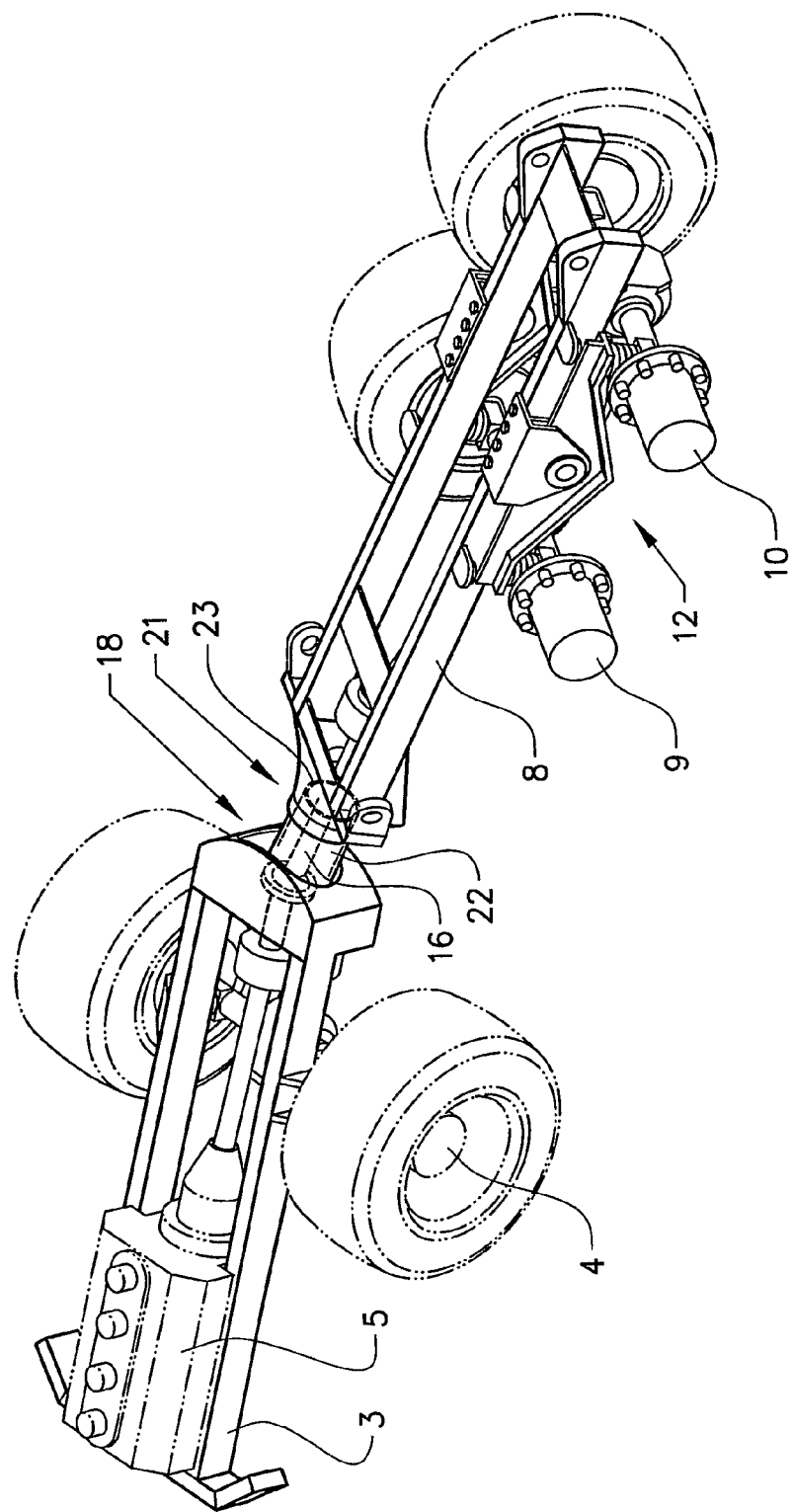
FIG. 2 illustrates a front frame and a rear frame of the articulated hauler of FIG. 1, FIG. 3 schematically illustrates a first embodiment of the powertrain arrangement, and FIG. 4 schematically shows one example of a brake means design.

FIG. 2 illustrates the front frame 3 and the rear frame 8 in more detail in a perspective view. The front frame 3 is connected to the rear frame 8 by means of a first articulation joint 18 allowing the front frame 3 and the rear frame 8 to pivot relative to one another about a vertical axis for steering the vehicle. Thus, the articulated hauler 1 is a so-called frame-steered vehicle. A pair of hydraulic cylinders (not shown) is arranged one on each side of the articulation joint 18 and controlled by an operator via a steering wheel and/or a joy stick (not shown) for steering the vehicle.

A second articulation joint 21 is configured for allowing the front frame 3 and the rear frame 8 to pivot relative to one another about an imaginary longitudinal axis, i.e. an axis extending in the longitudinal direction of the vehicle 1. The articulation joint comprises two correspondingly shaped tubular parts, a first part 22 secured to the front frame 3 and a second part 23 secured to the rear frame. The first part 22 is glidingly received in the second part 23 so that the front frame 3 may pivot relative to the rear frame 8 about said longitudinal imaginary axis. Further, the first output shaft 16 extends through the second articulation joint 21.

In FIG. 2, the front frame 3 is in a turned position relative to the rear frame 8, wherein the turning is accomplished via the first articulation joint 18. Further, the front frame 3 is in a rotated position relative to the rear frame 8, wherein the rotation is achieved via the second articulation joint 21.

Figure 3:
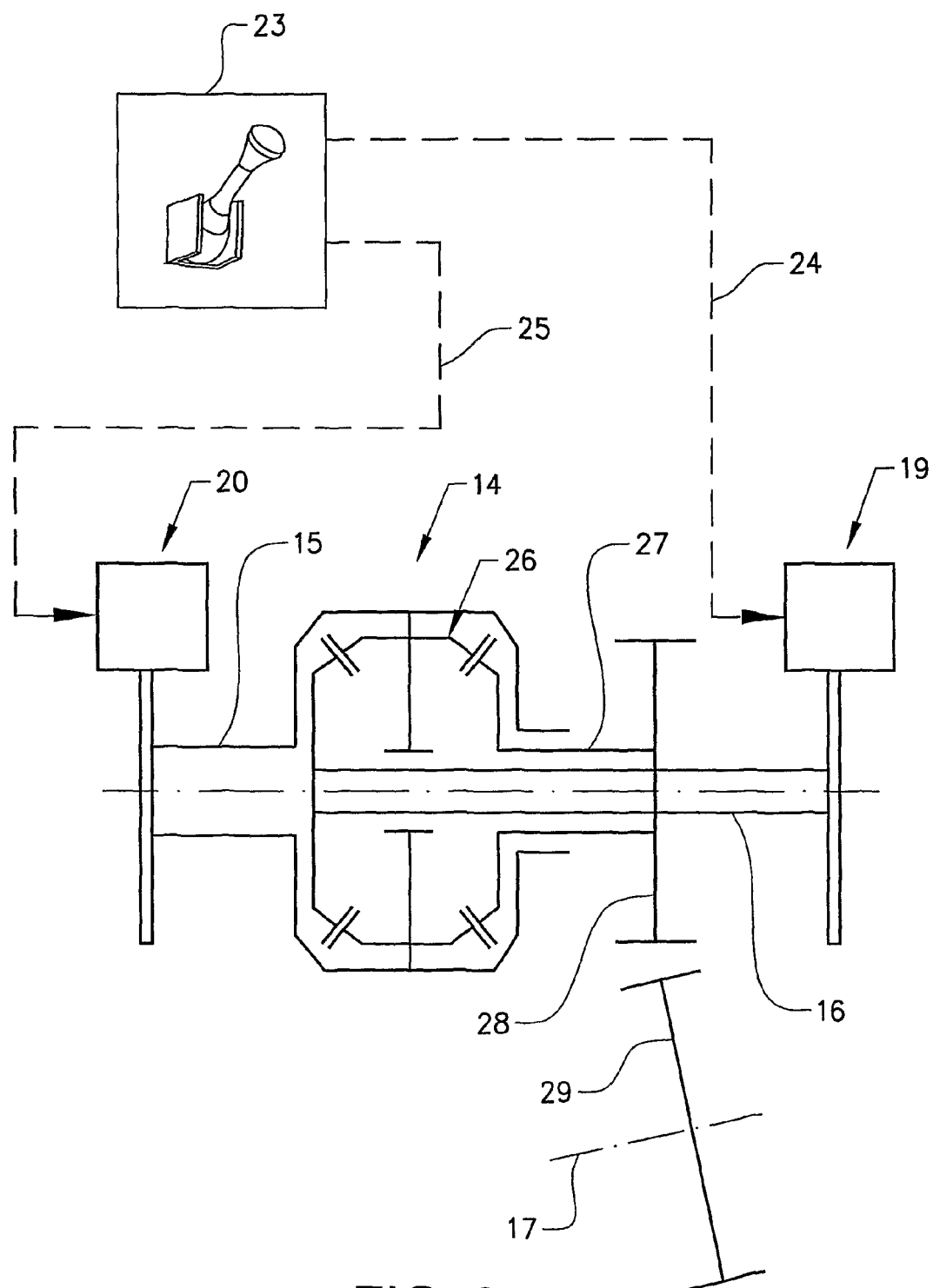

FIG. 3 schematically discloses the inventive power transmission arrangement. A parking brake actuating means 23 is operatively connected to each of the first and second brake means 19,20. The parking brake actuating means 23 comprises a hand controlled parking brake lever. A parking brake circuit is schematically indicated by the dotted lines 24, 25 connecting the parking brake actuating means 23 and each parking brake 19,20. The parking brake actuating means 23 further comprises a valve unit (not shown), which is operable by means of the lever. More particularly, the valve unit is adapted to release the hydraulic pressure to the brake means 19,20 when the lever is activated.

The transfer gear box 14 comprises a differential gear 26. The first output shaft 16 forms a first output from the differential gear 26. An intermediate output shaft 27 from the differential gear 26 is arranged concentric with regard to the first output shaft 16. The second output shaft 17 is drivingly connected to the intermediate output shaft 27 via two engaging gears 28,29.

Figure 4:
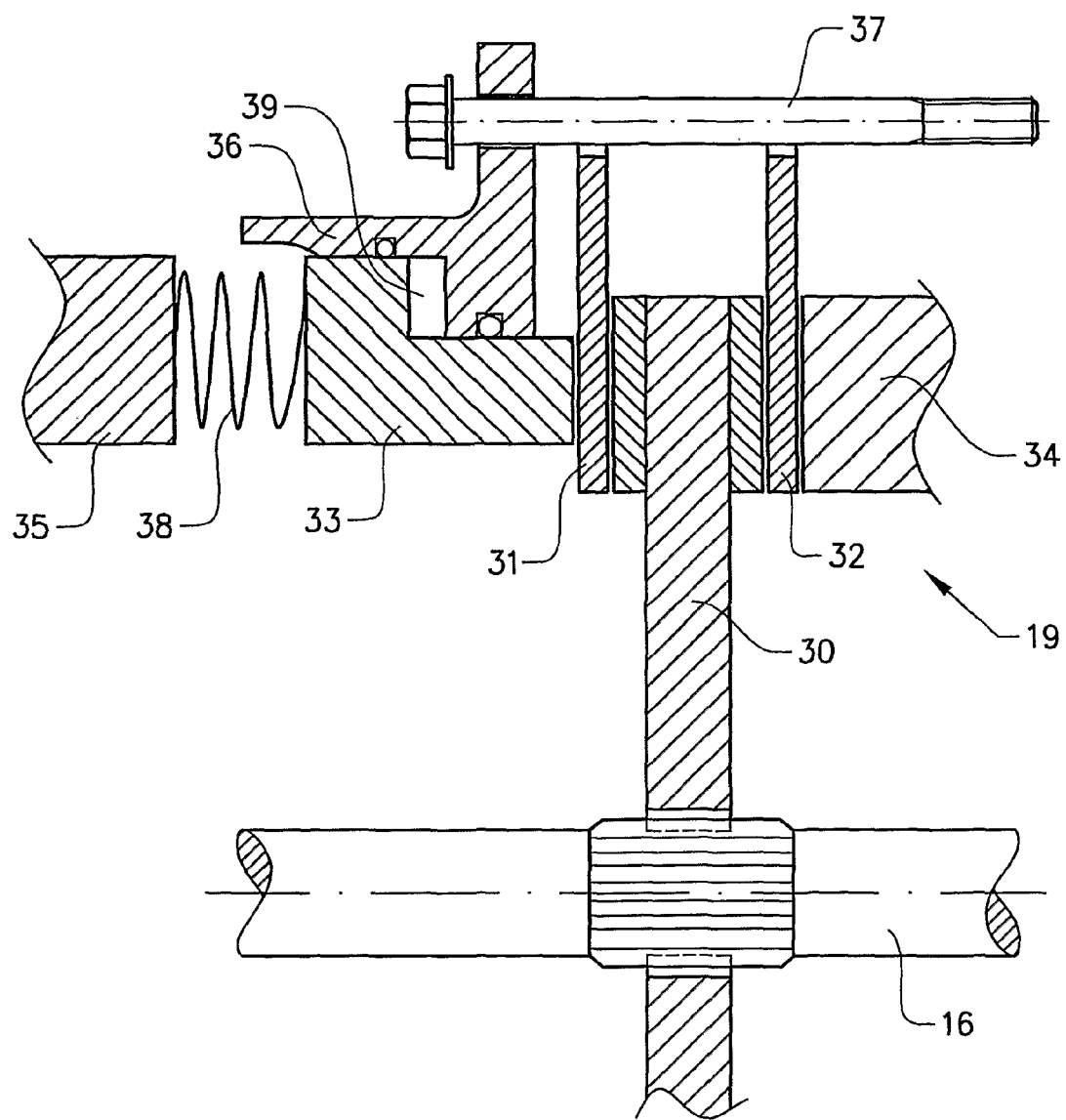

FIG. 4 schematically shows one embodiment of the first brake means 19. The first brake means 19 forms an air-mechanically controlled disc brake. A brake disc 30 is rotationally rigidly connected to the propeller shaft 16 via a spline connection. Brake pads 31,32 are provided on each side of the brake disc 30. A spring-applied piston 33 is adapted to effect the brake disc 30 by compressing it between the brake pads 31,32. Stationary housing parts are indicated by reference numerals 34,35,36. The brake pads 31,32 are movably connected to a bolt 37 extending in parallel to an axial direction of the shaft 16. The first brake means 19 is passive in that the spring 38 acts on the piston 33 and thereby engaging the brake disc 30 when there is no pressure applied to a chamber 39. On the other hand, when a sufficient pressure is applied to the chamber 39 for overcoming a counterforce of the spring, the brake disc 30 is released.

The first brake means 19 forms the main parking brake function. The second brake means 20 is of a similar design as the first brake means 19, but substantially smaller with regard to both braking power and size. FIG. 4 is thereby also a schematic representation of the second brake means 20.

When the parking brake is applied the front and rear axles 4,9,10 must be locked together, due to the normal load over the axle being too low to hold the machine on a steep slope. This is achieved by means of simultaneously applying the two parking brakes 19,20, wherein the smaller second parking brake 20 is adapted to absorb about half the necessary torque from the front axle 4, thereby locking the differential gear 26 and improving the parking brake function.

In an emergency function, the first and second brake means 19,20 (forming the parking brake function) may be used for an emergency brake function. The first and second brake means will be applied automatically if the feed pressure should be lost in the service brake circuit (s).

The invention is not in any way limited to the above described embodiments, instead a number of alternatives and modifications are possible without departing from the scope of the following claims.

For example, the invention is not limited to vehicles, but may also be used in stationary applications, such as in a papermill, where an efficient differential lock mechanism is desired.

More specifically, there are a number of alternatives apparent for the man skilled in the art once presented with the inventive concept. According to one example, the first brake means may be adapted to cause engagement of a longitudinal differential lock. Further, the first brake means forming the main parking brake function may be arranged in a rear wheel axle, acting on a transverse drive shaft (half shaft) in the axle. The first brake means may be a separate parking brake or the parking brake function may be integrated in the vehicle service brakes, such as the wheel brakes.

The invention claimed is:

1. A work machine power transmission arrangement comprising a differential gear having a differential case arranged in a transfer gear box and adapted to transfer power from an input shaft to a first output shaft, and a first brake adapted to effect the first output shaft, wherein the arrangement comprises a second brake adapted to effect the input shaft, wherein the second brake is arranged outside a casing of the transfer gear box and adapted to directly act on the input shaft, such that power flows from the input shaft through the second brake to the differential case when the second brake is not engaged.

2. An arrangement according to claim 1, wherein the second brake forms a disc brake.

3. An arrangement according to claim 1, wherein the second brake is spring-loaded.

4. An arrangement according to claim 1, wherein the second brake is adapted for a parking brake function.

5. An arrangement according to claim 1, wherein the first brake is adapted to act on the first output shaft.

6. An arrangement according to claim 1, wherein the first brake forms a disc brake.

7. An arrangement according to claim 1, wherein the first brake is spring-loaded.

8. An arrangement according to claim 1, wherein the first brake is adapted for a parking brake function.

9. An arrangement according to claim 1, wherein the first brake is configured to brake a substantially larger torque than the second brake.

10. An arrangement according to claim 1, wherein the second brake is configured to brake about half the torque that the first brake is capable of.

11. An arrangement according to claim 1, wherein the second brake is arranged at a distance from the differential gear.

12. A powertrain comprising the power transmission arrangement according to claim 1, the transfer gear box being adapted to transfer power from the input shaft to the first output shaft and to a second output shaft.

13. A powertrain according to claim 12, wherein the first brake is arranged downstream of the transfer gear box in a power transmission path.

14. A powertrain according to claim 12, wherein the first output shaft is adapted to drive at least one rear axle of a vehicle.

15. A powertrain according to claim 12, wherein the second output shaft is adapted to drive a front axle of a vehicle.

16. A powertrain according to claim 12, wherein the arrangement comprises a power source adapted to provide rotational power to the input shaft.

17. A vehicle comprising a powertrain according to claim 12.

18. A work machine comprising a powertrain according to claim 12.

19. An articulated hauler comprising a powertrain according to claim 12.

\* \* \* \* \*